United States Patent
Buehler et al.

(10) Patent No.: US 10,131,097 B2
(45) Date of Patent: Nov. 20, 2018

(54) CONTINUOUS PRODUCTION OF PROFILES IN A SANDWICH TYPE OF CONSTRUCTION WITH FOAM CORES AND RIGID-FOAM-FILLED PROFILE

(71) Applicants: Sebastian Buehler, Freiburg (DE); Karl-Heinz Semlitsch, Muerzzuschlag (AT); Sivakumara K. Krishnamoorthy, Pfungstadt (DE)

(72) Inventors: Sebastian Buehler, Freiburg (DE); Karl-Heinz Semlitsch, Muerzzuschlag (AT); Sivakumara K. Krishnamoorthy, Pfungstadt (DE)

(73) Assignee: Evonik Röhm GmbH, Darmstadt (DE)

( * ) Notice: Subject to any disclaimer, the term of this patent is extended or adjusted under 35 U.S.C. 154(b) by 126 days.

(21) Appl. No.: 15/032,927

(22) PCT Filed: Oct. 22, 2014

(86) PCT No.: PCT/EP2014/072640
§ 371 (c)(1),
(2) Date: Apr. 28, 2016

(87) PCT Pub. No.: WO2015/062933
PCT Pub. Date: May 7, 2015

(65) Prior Publication Data
US 2016/0288431 A1     Oct. 6, 2016

(30) Foreign Application Priority Data

Oct. 30, 2013    (EP) ..................................... 13190866

(51) Int. Cl.
*B29C 70/52*     (2006.01)
*E04C 3/29*       (2006.01)
(Continued)

(52) U.S. Cl.
CPC ............ *B29C 70/52* (2013.01); *B29C 69/001* (2013.01); *B29C 70/16* (2013.01); *B29C 70/224* (2013.01);
(Continued)

(58) Field of Classification Search
CPC ... B29C 70/528; B29C 70/525–70/527; B29C 70/52; B29C 33/34; B29C 33/36; B29C 43/26; B29C 70/521–70/524
See application file for complete search history.

(56) References Cited

U.S. PATENT DOCUMENTS

| 3,383,266 A | 5/1968 | Helm |
| 3,895,896 A * | 7/1975 | White ................... B29C 70/085 264/137 |

(Continued)

FOREIGN PATENT DOCUMENTS

| CN | 103 244 753 A | 8/2013 |
| CN | 103264512 A | 8/2013 |

(Continued)

OTHER PUBLICATIONS

"Lighter Planes with Rohacell", Plastics Online, Magazine Plastiks: plastics processing industry, 2007, XP002722675, http://www.plastics.ru/index.php?lang=en&view=journal&category_id=91&year=2007&entry_id=626, (2 pages).

(Continued)

*Primary Examiner* — William P Bell
(74) *Attorney, Agent, or Firm* — Oblon, McClelland, Maier & Neustadt, L.L.P.

(57) ABSTRACT

The present invention relates to a novel process for the production of novel fiber-reinforced profile materials comprising a rigid foam core, in particular a PMI foam core. In particular, the present invention relates to a novel process which can be carried out in two variants, a short Pul-press (Continued)

Figure 1:
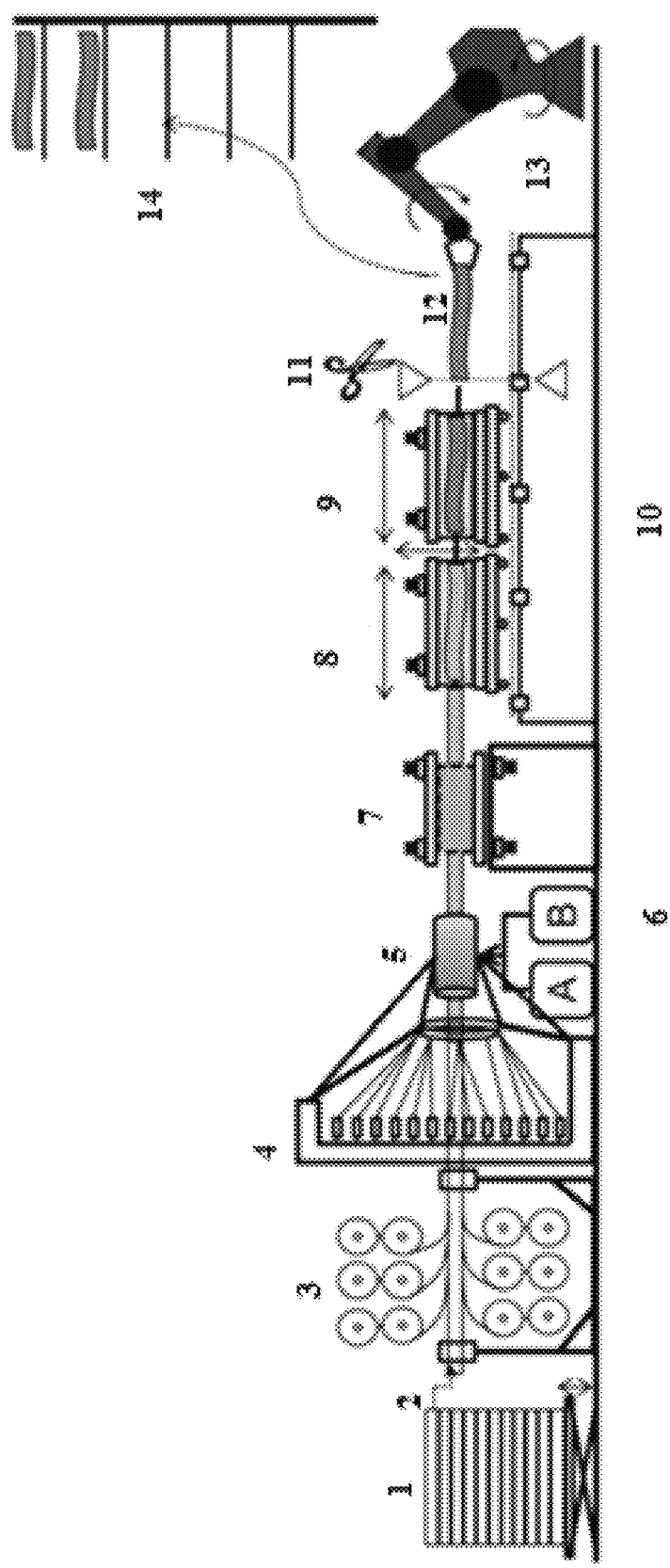

process and a Pul-shape process. One step here produces a fiber-reinforced profile material and simultaneously inserts the rigid foam core into same. The same step moreover ensures very good binding of the rigid foam core to the fiber-reinforced profile material.

15 Claims, 2 Drawing Sheets

(51) Int. Cl.
| | |
|---|---|
| *B29C 69/00* | (2006.01) |
| *B29C 70/16* | (2006.01) |
| *B29C 70/22* | (2006.01) |
| *E04C 2/30* | (2006.01) |
| *E04B 2/00* | (2006.01) |
| *E04C 2/22* | (2006.01) |
| *B29K 105/04* | (2006.01) |
| *B29K 33/00* | (2006.01) |
| *B29L 22/00* | (2006.01) |

(52) U.S. Cl.
CPC ............ *B29C 70/528* (2013.01); *E04C 2/30* (2013.01); *E04C 2/44* (2013.01); *E04C 3/29* (2013.01); *B29K 2033/00* (2013.01); *B29K 2105/04* (2013.01); *B29K 2633/26* (2013.01); *B29L 2022/00* (2013.01)

(56) References Cited

U.S. PATENT DOCUMENTS

| | | | | |
|---|---|---|---|---|
| 3,917,774 A | * | 11/1975 | Sagane | ................... B29C 44/12 264/109 |
| 4,935,279 A | * | 6/1990 | Perko | ..................... B29C 70/38 40/615 |
| 5,439,215 A | * | 8/1995 | Ratchford | ........... B29C 53/8016 473/561 |
| 5,948,472 A | * | 9/1999 | Lawrie | ..................... A63C 5/12 156/180 |
| 6,197,412 B1 | * | 3/2001 | Jambois | .................. B29C 47/28 428/297.4 |
| 2002/0014302 A1 | * | 2/2002 | Fanucci | ................ B29C 70/525 156/179 |
| 2011/0306718 A1 | * | 12/2011 | Scherzer | ................ C08G 69/48 524/538 |
| 2015/0151496 A1 | | 6/2015 | Kraatz et al. | |

FOREIGN PATENT DOCUMENTS

| | | | |
|---|---|---|---|
| CN | 104487231 A | 4/2015 | |
| DE | 2461706 A1 * | 7/1975 | ........... B29C 70/525 |
| DE | 44 16 796 A1 | 11/1995 | |
| DE | 299 13 877 U1 | 11/1999 | |
| EP | 1275490 A2 * | 1/2003 | ........... B29C 70/525 |
| GB | 898 597 A | 6/1962 | |
| JP | H04339635 A | 11/1992 | |

OTHER PUBLICATIONS

International Search Report dated Jan. 20, 2015 for PCT/EP2014/072640 filed Oct. 22, 2014.
European Search Report dated Apr. 2, 2014 for EP 13 19 0866 filed Oct. 30, 2013.

* cited by examiner

US 10,131,097 B2

CONTINUOUS PRODUCTION OF PROFILES IN A SANDWICH TYPE OF CONSTRUCTION WITH FOAM CORES AND RIGID-FOAM-FILLED PROFILE

FIELD OF THE INVENTION

The present invention relates to a novel process for the production of novel fibre-reinforced profile materials comprising a rigid foam core, in particular a PMI foam core. In particular, the present invention relates to a novel process which can be carried out in two variants, a Pul-press process and a Pul-shape process. One step here continuously produces a complex fibre-reinforced profile material and simultaneously inserts the rigid foam core into same. The same step moreover ensures very good binding of the rigid foam core to the fibre-reinforced profile material.

PRIOR ART

According to the prior art, hollow bodies comprising PMI foams can be produced by means of what is known as the in-mould process. In this, granulated material is charged to the finished hollow bodies and is then thermally foamed and thereby crosslinked. This process has the disadvantage of requiring a plurality of steps, namely production of the hollow body, charging of the granulated material and foaming. A further disadvantage is that because of the relatively high foaming temperatures of the PMI it is not possible to use thermally unstable materials, for example a composite made of carbon fibres and of an epoxy resin. Furthermore, the binding brought about between foam and outer layer during the foaming process is only weak. This type of in-mould process is described by way of example in WO 2012/013393. Alternatively according to the prior art, PUR foam fill materials are injected as liquid into the cavity and are then foamed and hardened. However, this process firstly has disadvantages similar to those of the PMI-foam-fill process described, and moreover is not transferable to PMI.

Alternatively, open shell parts can be filled with a cut-to-size foam core, and then a second shell part can be adhesive-bonded or welded to the first shell part to form the hollow profile. In order to improve binding of the foam core, an adhesive layer can moreover be applied at the interfaces. Disadvantages of this process are that a large number of time-consuming steps are required, that the final product has joins, and that a large quantity of offcut material can arise during the production of the foam core, depending on the shape of same.

In one variant described in WO 2012/052219, the foam core is placed together with the textile material—for example carbon fibres—in a mould, and the resin—e.g. epoxy resin—is injected into this mould and hardened. Although this process avoids joins, it achieves this at the cost of disadvantages the same as those of the process described previously in relation to offcut material, process speed and complexity.

The pultrusion process is an established process based on original developments at the beginning of the 1950s. The pultrusion process is used to produce continuously fibre-reinforced plastics profiles, examples of which include hollow profiles, in particular tubes. Originally this process used a polyester resin or an epoxy resin to impregnate a plurality of glass fibres (glass rovings), which were then combined by way of one or more shaping moulds into the final shape. Finally, the resin is hardened and the continuously produced profile is sawn into individual workpieces.

In particular, the pultrusion process is a process which permits saturation of a plurality of fibres or rovings with a resin in a first step. A distinction is drawn here between what is known as an open pultrusion process in which this resin-saturation takes place in a saturation trough through which the fibres are passed and a closed process in which the saturation with the resin takes place only at a later stage: in the actual shaping instrument, under pressure. The plants generally have pre-saturation devices such as cardin grids, by means of which the fibres are distributed in the way necessary for subsequent shaping and optionally provided rovings can be parted into individual fibres. It is also possible to use non-wovens, woven fabrics and/or laid scrims as fibre material as an alternative to, or in addition to, rovings and/or fibres.

The International Patent Application WO 2013/174665 describes what is known as a Pul-core process for the production of profiles with a foam core and with composite sheathing. However, this type of process is restricted to the production of non-varying, e.g. tubular, cross sections. More complex shapes, e.g. in the simplest case variations of cross section in a profile material, can be realized according to the prior art only by means of a time-consuming hand-layup process or a batch RTM (resin transfer moulding) process.

OBJECT

The object underlying the present invention was particularly to provide a novel process for the production of fibre-reinforced profiles comprising a rigid foam material, such as a PMI foam, which process is also suitable for complex shapes or variations of the cross section in the workpiece.

In particular, it was an object of the present invention to provide a process by which it is possible to realize large numbers of units of complex profiles of sandwich structure with external FPC (fibre-plastics-composite) skin and rigid foam cores, such as P(M)I (poly(meth)acrylimide) foam cores.

A particular object was that it be possible to carry out the process continuously.

Another object of the present invention was to provide a process which permits very good binding between foam core and exterior outer layers. It is moreover to be possible by means of the process according to the invention to use, as outer material, even materials that are not heat-resistant at the foaming temperature of the PMI.

Another object was that it be possible to carry out the process rapidly, in a small number of steps and at low cost.

Another object of the present invention was to provide novel hollow profiles which comprise a rigid foam and which a) have no adhesive layer between outer material of the hollow profile and the rigid foam core, b) have no joins and c) have good binding between outer material and rigid foam core. A particular object here was to provide hollow profiles with outer material composed of a polymer-resin-bonded fibre material and with core composed of a rigid foam core, where the pore size and therefore the density of the foam core can be adjusted flexibly.

Other objects not explicitly mentioned at this point can be apparent from the description, the drawings and/or the examples.

ACHIEVEMENT OF OBJECT

The objects are achieved by means of a novel process for the continuous production of complex fibre-reinforced profiles comprising a rigid foam core, in particular a P(M)I foam core, preferably a PMI foam core. The first steps of this process are a pultrusion process, in which a foam core made of PMI is introduced in the middle, and the final steps are a process which is more similar to the RTM process. A foam core is wrapped with a fibre material here by means of a process analogous to the pultrusion process, but said fibre material here is not already saturated with a resin. The saturation with the resin to form the outer layer made of the fibre material and of the resin, which can be a thermoplastic or a reactive resin that forms a thermoset, preferably takes place, and in this case in contrast to the known pultrusion process, only after the wrapping of the foam core. Although according to the invention the saturation of the fibre material with the resin can also take place before the wrapping, e.g. by passing the fibres through a trough of resin, this procedure has the disadvantage of an additional step in comparison with the preferred embodiment.

The process according to the invention for the continuous production of fibre-reinforced profiles comprising a foam core has the following steps:

a) introduction of foam cores and connecting of the newly introduced foam core to the end of the most recently introduced foam core, b) wrapping a fibre material around the foam core, c) impregnation of the fibre-material wrap with a resin, d) optional moulding of the wrapped foam core in a first mould, e) heating and thereby optional hardening of the resin in a second mould, f) cooling of the wrapped foam core in a third mould and g) separation of individual profiles by means of cutting or sawing and removal of the finished workpiece.

The steps b) and c) here do not necessarily have to be carried out in the stated sequence. In an alternative embodiment of the invention, the fibres can also first be passed through an impregnation apparatus, such as an impregnation bath, and then wound around the foam core.

In order to be able to operate the process continuously, the second and third mould must be moved to and fro in respectively mutually opposite direction, preferably on carriages. The two moulds here reach the respective turning point at very nearly the same time, and once that point has been reached the mould is moved in the respective opposite direction.

At the first turning point of the two moulds these have maximum distance from one another. In this position it is preferable that the following take place simultaneously: the removal of the finished profile or—this term being used synonymously hereinafter—workpiece from the third mould and the acceptance, into the second mould, of the foam core wrapped with the fibre material. For this, the two moulds can already be opened on the final section of the path prior to reaching said position, or the second mould, which at this stage is empty, can also be open during its movement from the other turning point to said position.

At the second turning point, the two moulds have reached the position closest to one another. At this point, the heated profile section moulded in step d) is transferred from the second mould into the third mould. For this, the two moulds can already be opened on the final section of the path prior to reaching said position, or the third mould, which at this stage is empty, can also be open during its movement from the other turning point to said position.

There are various possibilities for the transport of the continuous profile during the process. The continuous profile can be forwarded by way of rolls or hooks in front of or directly behind step b). It is also possible that appropriate devices are used to pull the continuous profile in front of step g). It is preferable that the transport takes place by way of the second and the third mould, or more precisely by way of the respective mould that specifically comprises a section of the continuous profile. However, this variant requires assistance from an additional transport mechanism for the transfer of the continuous profile section from mould two into mould three. It is moreover possible to combine the various variants.

Re step a): Since, in contrast to the fibre material, the foam core cannot be provided on rolls with several hundred meters of material, this preferably takes the form of a plurality of successive individual pieces passed continuously into the plant. This can take place manually or in particular can be automated with use of standard-length foam pieces. These individual pieces are then preferably connected to one another by means of adhesive bonding or insertion, or through addition of a coupling piece. In the case of insertion, the foam cores can have been prefabricated with appropriate grooves or recesses for this purpose. In the case of adhesive bonding it is important that the corresponding adhesive hardens rapidly. The application of the adhesive to one of the surfaces for this purpose can take place manually, even in the case of continuous operation. There can in turn be prefabricated coupling pieces located at each of the two ends of the foam core pieces provided. The second foam core piece is then simply moved into said coupling piece. Another possible alternative is two-part coupling pieces which are located in complementary manner at the two ends of the foam workpiece and which can by way of example be connected to one another by way of a simple click mechanism.

Step b): The selection of the suitable fibre material used in step b) to wrap the foam core presents no problem to the person skilled in the art, because the fibre materials that can be processed are known from established pultrusion technology. It is preferable that the fibre material is carbon fibres, glass fibres, polymer fibres, in particular aramid fibres, or textile fibres, particularly preferably aramid fibres or carbon fibres. The fibre material used can take the form of individual fibres or rovings and/or non-wovens, woven fabrics and/or laid scrims. It is preferable that the fibre material used takes the form of continuous-filament fibres or of continuous rovings.

The transport of the fibres generally takes place through pulling of the continuous profile at the end of the plant, e.g. by use of a caterpillar take-off or by use of reciprocating hydraulic grippers.

In the shaping process it is possible that the orientation of the fibres is parallel to one another in the direction of processing, around the foam core. However, it is preferable that the fibres form a textile structure around the foam core. This design achieves particular mechanical strength of the subsequent workpiece.

There are several variants of the pultrusion process, and aspects of these can be transferred to step b) of the process according to the invention by providing additional foam core introduction.

The Pul-winding process is similar to the basic pultrusion process. However, in this process, by use of rotating winding equipment, the reinforcement fibres are covered with the matrix at various angles and then hardened in a shaping mould. By use of this technology it is possible to achieve compliance with particularly stringent loading requirements placed upon tubes, rods or other profiles. This process can be designed with a variety of rotating angles. The angles are generally adjustable from 0° to 85°. The foam core here is surrounded by, and wrapped with, resin-saturated fibre material.

The Pul-braiding process is a variant of the Pul-winding process in which it is possible to process a plurality of various layers of fibre material in a braid structure.

In the Pul-preforming process, prefabricated preforms made of fibre material are used to provide the necessary properties to the profile. This leads in particular to relatively high multidirectional strength values. The term preforms here means defined woven fabrics, laid scrims, tubes or other prefabricated dry preforms which are bonded to the matrix material in the continuous process by means of an immersion-saturation process or injection process. In this variant of the process, the foam core can be introduced during production of the preforms. Saturation with the resin accordingly takes place on the preform comprising the foam core. Because of the closed pore structure of the PMI foam material, the resin enters only the open pores present at the external surface.

In step c), impregnation with a resin takes place. The resin used, which subsequently forms the matrix material of the fibre-plastics composite shell of the profile, can be any thermoplastic material suitable for the pultrusion or any resin that can be reacted to give a thermoset after crosslinking. Preference is given to said resins that can be reacted to give a thermoset. In particular, these are polyester resins, vinyl ester resins, phenolic resins, PU resins or epoxy resins, particularly preferably being PU resins or epoxy resins.

Step d): After, or at the same time as, the impregnation with the resin, shaping of the profile, e.g. by continuous thermal shaping, can take place in step d). This shaping can by way of example take place by use of one or more mould sleeves. In particular, the shaping takes place in a compression mould based on the RTM process. For this, the otherwise continuous transport of the continuous foam core, and also the sheathing with the fibre material, can be stopped briefly for said compression, while the compression mould remains closed. According to the invention, the fibre material completely surrounds the foam core material here. It is moreover preferable that by use of the compression mould the ends of the compressed section of the continuous foam core piece are pressed together with resin-saturated fibre wrapping in such a way that the resin-saturated fibre material completely or almost completely encloses the foam core. The temperature for the shaping process depends particularly on the resin system used. This temperature by way of example for epoxy resins is preferably from 20 to 100° C., particularly preferably from 50 to 80° C.

A major advantage of this shaping process is that it can take place continuously, and that a continuous profile divided into sections is thus then obtained. At the end of the plant, in step g) this continuous profile is fully automatically separated into individual workpieces of desired length.

Step e): In parallel with step d) or subsequently thereto, the unfinished profile formed in steps a) to b) and, respectively, c) is heated in a mould—which if subsequent is a second mould. In the case of resins that harden to give thermosets, the outer material thus hardens, and the given shape of the workpiece is thus also fixed. The hardening of the resin, which can also be termed reinforcement material, generally takes place thermally here. The temperature used for this purpose in the shaping mould depends on the respective resin used, and can easily be determined by the person skilled in the art. These temperatures are generally from 100 to 300° C. In order to ensure uniform hardening of workpieces, care has to be taken here that temperature distribution within the mould is uniform.

The second mould here can also be utilized for reinforcing the shaping process or for additional shaping—by use of appropriate shaping of the inside of the mould.

If the resin is not one that will subsequently form a thermoset, but instead is a thermoplastic material, another alternative possibility is that, in step c), the resin is applied at a temperature higher than the melting point or glass transition temperature to the fibres, and that the "hardening" is delayed to step f) with cooling.

Step f): The first mould, for shaping, and the second mould, for heating, are followed by a third mould, for the cooling of the finished hollow profile. Ideally, the inside of this third mould also replicates the shape of the shaped profile section inserted into this third mould. In the case of thermoplastic resins, the hardening of the outer layer also takes place here. A mould jacket comprising air or water or comprising other coolants can be present for the cooling process. The temperatures at which the cooling process takes place are generally from 0 to 120° C., preferably from 10 to 50° C. and particularly preferably from 20 to 30° C.

Step g): The separation of the individual profiles takes place by means of cutting or sawing. In one preferred embodiment, this separation takes place at the same time as the shaping of another profile section in step d), when the transport of the continuous profile has been stopped briefly for the shaping process. After the separation process, the removal of the finished workpiece by way of example by means of a robot arm, and the optional acceptance into a storage system take place.

The profile components produced by means of the process according to the invention have a sandwich structure with foam cores. A major advantage of the novel process according to the invention is that this can be carried out in a continuous process by use of two compression devices designed for tandem operation—the first and the second mould. Advantages that can be utilized are therefore the following:

- continuous production of complex geometries with undercuts and cross section changes
- shaping and guiding in one step
- no handling problems with the preform fibres
- the matrix material can be melted or gelled in the first mould. A further reduction in process times can thus be realized.
- the moulds are temperature-controllable, and it is therefore possible to process not only thermoset matrices but also thermoplastic matrices.
- one or two moulds are heatable, and one mould is coolable. It is thus possible to achieve narrow manufacturing tolerances, rapid hardening times and short cycle times.
- the two compression devices can serve for take-off of the profile and can keep the profile under tension. It is thus possible to achieve ideal orientation of the fibres.
- short cycle times, and thus achievement of high numbers of units and capability for mass production
- optional connection of the individual moulded core materials by coupling connectors.

In particular, there are two particularly preferred embodiments of the present invention:

The first preferred embodiment of the process is a variant that may be termed a Pul-press process. In this embodiment, shown diagrammatically in FIG. 1, steps a) to g) take place in moulds and, respectively, devices that are separate from one another. This embodiment can be realized in existing pultrusion plants with relatively little reengineering and is in particular suitable for moulded workpieces that are, however, relatively straight in the direction of transport.

The second preferred embodiment of the process is a variant that may be termed a Pul-shape process. In the Pul-press process it is not possible to process profiles of any desired type or having very high degrees of complexity. The Pul-shape process therefore has broader scope. In this Pul-shape process, the first and the second mould are the same mould. Steps c), d) and e) are moreover carried out simultaneously in this universal mould. This mould is therefore a device which moves on carriages and which is heatable and into which the resin is passed. The following therefore take place simultaneously in said shaping mould: the final shaping, the hardening of the resin, a calibration process and the transport. The calibration process here means relatively brief heat-conditioning of the resin composition.

The Pul-shape process can achieve the following additional advantages:
  lean process with few steps and corresponding cost advantages
  resin injection into the first heatable mould with simultaneous final shaping
  injection into a closed system and thus good achievability of fibre-matrix ratio
  higher degrees of forming realized through appropriately preformed dry semifinished products
  little offcut material.

Both the Pul-shape process and the Pul-press process here can be combined with process aspects of the abovementioned Pul-preforming, Pul-winding or Pul-braiding process.

With this novel process—irrespective of the embodiment—it is possible to produce a variety of profile types. The profiles can have one or more chambers. Profiles with one chamber can by way of example take the form of round tube or else of rectangular or square profile with chamber. It is also possible to produce profiles with complex shape, i.e. two or more differently shaped or differently dimensioned chambers. Round tubes can by way of example have not only a simple round shape, with round foam core and round jacket, but can also by way of example have a round foam core and a polygonal jacket, or a polygonal foam core and a round jacket. Irrespective of the shape and the number of chambers, the continuous profile can be produced with various wall thicknesses and/or foam core dimensions.

According to the invention, it is in particular possible, in particular by means of the Pul-shape process described, to realize curved workpieces, or else workpieces and, respectively, profiles that have non-uniform shape in the direction of transport.

The material used for the foam core is preferably poly (meth)acrylimide, for which this text also uses the abbreviation P(M)I. (Meth)acryl- here means methacryl-, acryl- or mixtures of the two. PMI foams are particularly preferred. These PMI foams are normally produced in a two-stage process: a) production of a cast polymer and b) foaming of said cast polymer. However, it is also alternatively possible to use foam cores made of other rigid foam materials, particular examples being PET foams, PVC foams, PU foams or PP foams. However, PMI foams have the major advantage that these undergo further foaming in the first and/or second mould, thus giving particularly good adhesion at the boundary between the foam core and the outer layers.

The foam parts required as core material for the process can either be produced by a production process using in-mould foaming or else can preferably be cut, sawn or milled from foamed sheets which can be produced from cast polymers. It is preferably possible here to cut a plurality of foam parts from one sheet. In one particular alternative, it is also optionally possible that the offcut material from the production of relatively large PMI foam parts of the type used by way of example in aircraft construction or in the construction of wind turbines is chopped and used.

Production of the cast polymer begins with production of monomer mixtures which comprise, as main constituents, (meth)acrylic acid and (meth)acrylonitrile, preferably in a molar ratio of from 2:3 to 3:2. It is also possible to use other comonomers, for example esters of acrylic or of methacrylic acid, styrene, maleic acid or itaconic acid or, respectively, anhydrides thereof or vinylpyrrolidone. However, the proportion of the comonomers here should not be more than 30% by weight. Small amounts of crosslinking monomers, e.g. allyl acrylate, can also be used. However, the amounts should preferably be at most from 0.05% by weight to 2.0% by weight.

The copolymerization mixture moreover comprises blowing agents which at temperatures of about 150 to 250° C. either decompose or vaporize and thus form a gas phase. The polymerization takes place below this temperature, and the cast polymer therefore comprises a latent blowing agent. The polymerization advantageously takes place in a block mould between two glass plates.

In a second step, the foaming of the cast polymer then takes place at an appropriate temperature. The production of these PMI foams is known in principle to the person skilled in the art and can by way of example be found in EP 1 444 293, EP 1 678 244 or WO 2011/138060.

It is particularly preferable to use, as material for the foam core, PMI foams in the density range from 30 to 200 kg/m$^3$. PMI foams that may be mentioned in particular are ROHACELL® grades from Evonik Industries AG.

An advantage of sawn, cut or milled foam core pieces here over pieces produced by means of in-mould foaming is that they have open pores at the surface. During contact with the fibres and the subsequent impregnation with the resin, some of the resin penetrates into these open pores at the foam core surface. This has the advantage that hardening gives particularly strong adhesion at the boundary between foam core and jacket material.

As mentioned above, the process of the invention can also process other rigid foams. These can in particular be rigid PET foams, rigid PVC foams, rigid PP foams or rigid PU foams.

Rigid PVC foams are mostly used as sandwich material in boatbuilding, rotor blades or motor vehicles in conjunction with outer layers. PVC foam in the density range from 25 to 300 kg/m$^3$ is available commercially and is widely used. PVC foams have particularly high temperature resistance, but only limited capability of withstanding mechanical load.

PP foams are known mainly as insulation material, in transport containers and as sandwich material. PP foams can comprise fillers and are mostly available commercially in the density range from 20 to 200 kg/m$^3$. In order to achieve better adhesion it is possible in particular to provide the surfaces of a PP foam with an adhesive layer or an adhesion promoter before step a).

Rigid PU foams in turn feature a more closed pore structure than flexible PU foams and a higher degree of crosslinking. Rigid PU foams can also comprise relatively large quantities of inorganic filler materials.

The present invention provides not only said process but equally provides novel profiles, composed of a rigid foam core, in particular of a PMI foam core and of an outer material which has been formed from a fibre material and from a matrix material. The description provided above in relation to the process applies equally to the materials used here. It is preferable that the matrix material is a thermoset, in particular a hardened epoxy resin or hardened PU resin. The fibre material is in particular carbon fibres, aramid fibres or glass fibres.

A particular feature of this type of profile according to the invention, comprising a rigid foam, such as a PMI foam, is that the outer material is a thermoset reinforced with fibre material, and the foam core is a PMI foam, and that the profile comprising PMI foam has no adhesive layer and no joins. The outer material moreover encloses the foam core entirely or with only very small gaps. The meaning of very small gaps here is that when the shaping process takes place in the compression mould, where the ends of the section, as described above, are pressed together, small regions of the foam core can continue to be visible. However, the compression process particularly preferably takes place in such a way that in the finished profile none of the foam core at all remains discernible from the outside.

Equally preferably, at the interface between rigid foam core and the outside material the rigid foam core has open pores comprising matrix material.

This type of novel profile with a rigid foam core has major advantages over the prior art. The absence of joins contributes to uniformity of mechanical strength and to increased overall stability of the profile. The absence of adhesive layers contributes to weight savings and to markedly greater ease of production, while mechanical strength is at least comparable.

The workpieces according to the invention moreover have very good mechanical properties, in particular in relation to very good buckling resistance, and compressive stiffness values. They also exhibit particularly high compressive strength values and increased energy absorption on impact, and when used in automobile construction they therefore contribute to improved bodywork stability by way of example in the event of a crash. In comparison with metal parts, and in particular with hollow bodies comprising no core, they can moreover at to better acoustics in bodywork, i.e. to a reduction in noise arising from the chassis.

In one particular embodiment, the rigid foam can comprise another material made of metal or of another plastic embedded in the foam material. This can by way of example be in the form of a tube. This type of tube can by way of example function as cable duct in the use in bodywork construction.

In addition, or irrespective thereof, the rigid foam can have inserts, in particular metallic inserts. These inserts serve subsequently as binding points for the component in the use by way of example in automobile construction or aircraft construction. It is possible here by way of example to introduce, as insert, a metal block into which a screw thread is then milled which then subsequently can be used for screw connections.

The profiles according to the invention with a foam core, in particular with a PMI foam core, or the mouldings produced by the process according to the invention, having a foam core, can be used in a variety of applications. An area of prime interest here is lightweight construction, but this description is in no way to be interpreted as restrictive. This relates in particular to automobile construction, commercial vehicle construction, shipbuilding, aircraft construction, helicopter construction, the construction of installations for obtaining energy from wind, robotics, and aerospace technology. In automobile construction, particular mention may be made by way of example of the construction of roof rails or floor struts. In aircrafts, mention may be made by way of example of the use as cabin floor support. In this type of use, the profiles according to the invention provide an alternative to aluminium or steel that is almost equivalent in the mechanical terms but markedly lighter.

EXAMPLES

Continuous production of a complex fibre-composite profile with a rigid PMI foam core:

ROHACELL® IG-F 51 foam cores are cut to size to give elongate rectangular shapes and then introduced continuously by a guiding system into the plant. In a step that follows, these are sheathed with dry and presaturated fibres: unidirectionally 90 fibres each 1600 tex (Toho Tenax T1600) and 48 fibres each 800 tex (Toho Tenax T800). In the preform mould all of the materials are consolidated and subjected to final saturation with a vinyl ester resin. The fibre-composite material (pultrudate), not yet hardened, is then continuously drawn into a displaceable and heatable compression device (compression device number 1) by way of a compression device for cooling (compression device number 2). The shaping and hardening then take place here. The hardening time is kept short by using a temperature suitable for these materials: 120° C. As soon as the profile has hardened, compression device number 1 reaches its end position. Here, the cooling compression device takes over the complex profile and in doing so continues the drawing of the pultrudate. While this happens, the opened compression device number 1 can travel back to its starting position, and the cycle begins again.

KEY TO THE DRAWINGS

Figure 2:
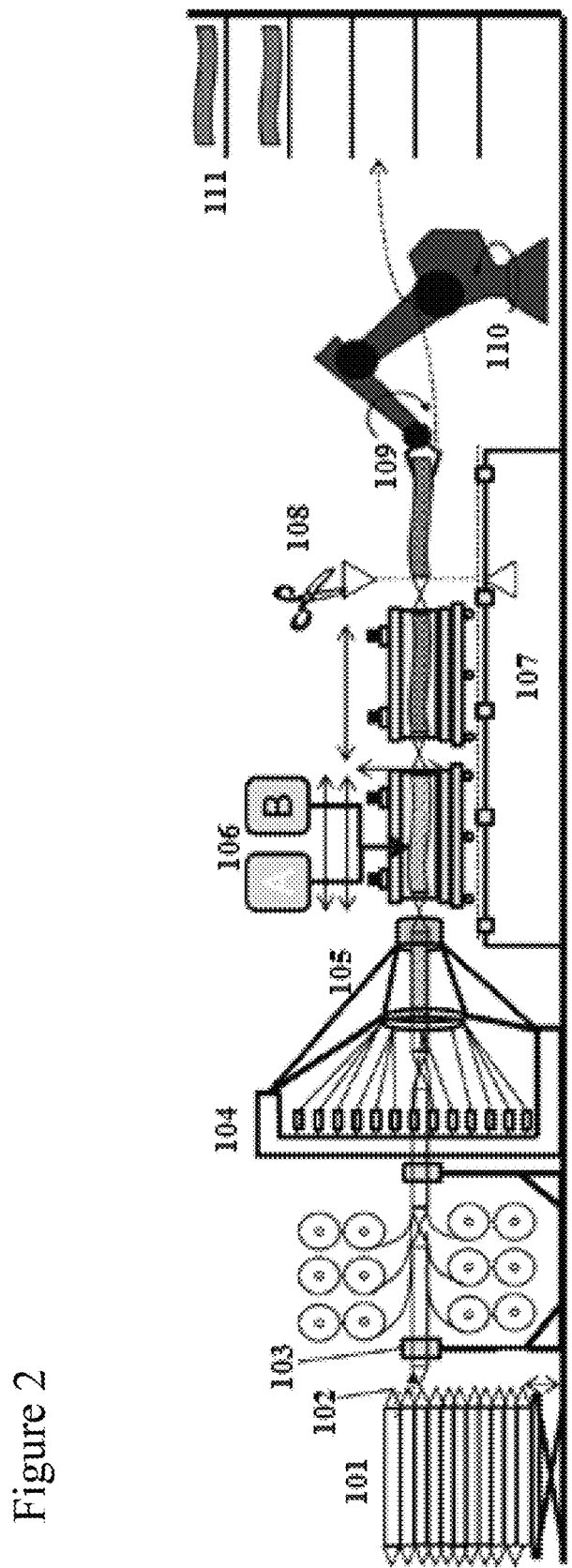

FIG. 1 shows by way of example a diagram of the construction of a plant suitable for the Pul-press process according to the invention. Key to FIG. 1 below:

(1) Foam core (available stock)
(2) Foam core (introduction into plant and connection to end of previous foam core)
(3) Introduction of fibre, unidirectional
(4) Winding, braiding device
(5) Resin impregnation
(6) Resin reservoir (in this case 2-component system with components A and B)
(7) Preforming mould
(8) Carriage-type heating mould
(9) Carriage-type cooling mould
(10) Displacement system with drive for moulds (8) and (9)
(11) Cutting device
(12) Finished profile
(13) Handling system for profile (12)
(14) Storage system FIG. 2 shows by way of example a diagram of the construction of a plant suitable for the Pul-shape process according to the invention. Key to FIG. 2 below:

(101) Thermoformed/moulded foam core (available stock)
(102) Coupling piece (this variant can also be used in the embodiment according to FIG. 1)
(103) Foam core guide system (analogous to (2) in FIG. 1))
(104) Introduction of fibre, unidirectional, and also winding, braiding device (analogous to FIG. 1, (3), (4))
(105) Guiding system for dry semifinished product (106) Mould with resin infiltration, with optional further shaping, heating and attached resin reservoir (in this case 2-component system with components A and B); this mould assumes the functions of the moulds (5), (7) and (8) in the embodiment according to FIG. 1

(107) Carriage-type cooling mould
(108) Cutting device
(109) Finished profile
(110) Handling system for profile (109)
(111) Storage system In connection with the drawings it should be noted that these are merely diagrams of the respective embodiments. The carriage on which the first and the second mould are moved is naturally markedly longer, in order to realize an adequate transport path and thus an adequately long heating and, respectively, cooling process. The precise length will be calculated by the person skilled in the art in particular from the operating speed, the thickness of the outer layer and to the properties of the resin used.

The invention claimed is:

1. A process for continuous production of fibre-reinforced profiles comprising a foam core, the process comprising:
   a) introducing foam cores and connecting a newly introduced foam core to an end of the most recently introduced foam core;
   b) wrapping a fibre material around the foam core;
   c) impregnating the fibre-material wrap with a resin;
   d) optionally moulding the wrapped foam core in a first mould;
   e) heating and thereby optionally hardening the resin in a second mould;
   f) cooling the wrapped foam core in a third mould; and
   g) separating individual profiles by cutting or sawing and removing the finished workpiece,
   wherein the second and third mould are moved in respectively mutually opposite direction on carriages.

2. The process according to claim 1, wherein the foam core takes the form of a plurality of successive individual pieces when it is continuously passed into a pultrusion plant, and the individual pieces are connected to one another by adhesion bonding or insertion or through addition of a coupling piece.

3. The process according to claim 1, wherein the fibre material is carbon fibres, glass fibres, polymer fibres, or textile fibres.

4. The process according to claim 1, wherein the resin is a thermoset.

5. The process according to claim 1, wherein the fibre material is in the form of individual fibres, rovings, nonwovens, woven fabrics and/or laid scrims.

6. The process according to claim 1, wherein the foam core is a core comprising poly(meth)acrylimide.

7. The process according to claim 6, wherein polymethacrylimide in the density range from 30 to 200 kg/m$^3$ is used as material for the foam core.

8. The process according to claim 1, wherein the fibre material in the wrapping is a prefabricated preform made of the fibre material.

9. The process according to claim 1, wherein the process is conducted as Pul-press process in which a) to g) take place in moulds or, respectively, devices that are separate from one another.

10. The process according to claim 1, wherein the process is carried out as Pul-shape process in which the first and the second mould are the same mould, in which c), d) and e) are carried out simultaneously.

11. The process according to claim 1, wherein the fibre material is aramid fibres.

12. The process according to claim 1, wherein the resin is a thermoset comprising a material comprising a polyester resin, a vinyl ester resin, a phenolic resin, a PU resin, an epoxy resin, or any combination thereof.

13. The process according to claim 1, wherein the resin is a thermoset comprising a material comprising a PU resin or an epoxy resin.

14. The process according to claim 1, wherein the wrapping is carried out with rotating winding equipment.

15. The process according to claim 1, wherein the wrapping is wrapping a plurality of various layers of the fibre material around the foam core in a braid structure.

* * * * *